May 19, 1931. J. BERGE 1,805,937
LOCK CAP FOR FASTENERS
Filed Dec. 27, 1928 2 Sheets-Sheet 1
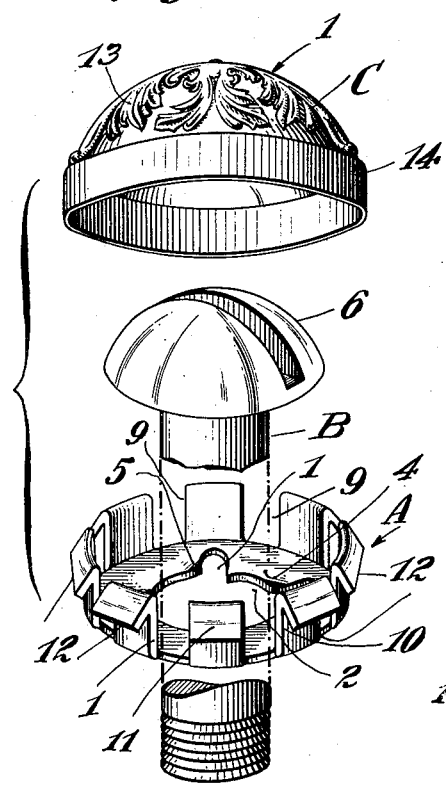
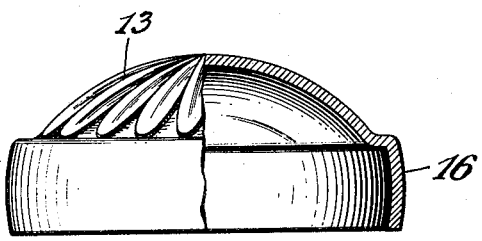
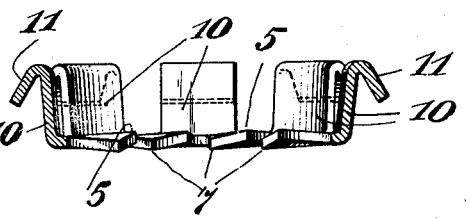
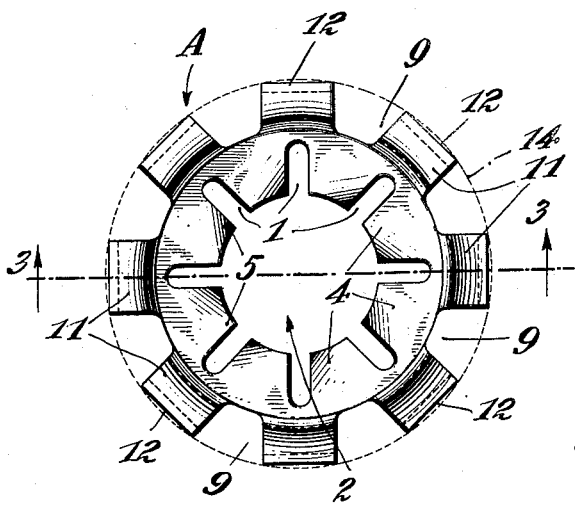
INVENTOR
Joseph Berge
BY
George Ramsey
his ATTORNEY May 19, 1931.  J. BERGE  1,805,937
LOCK CAP FOR FASTENERS
Filed Dec. 27, 1928   2 Sheets-Sheet 2
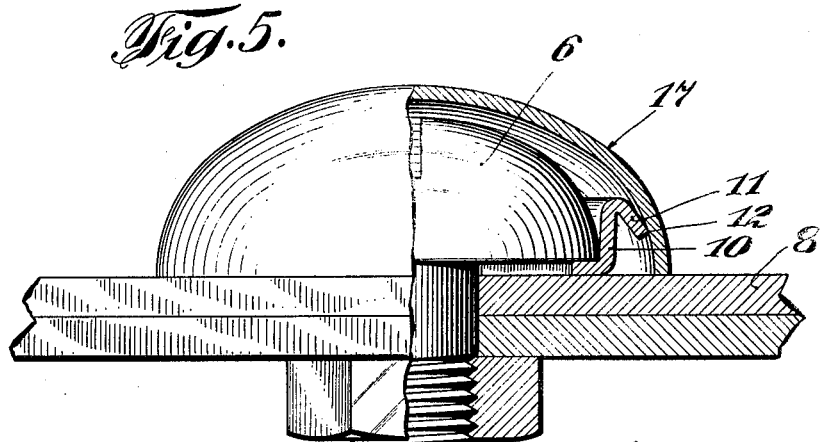
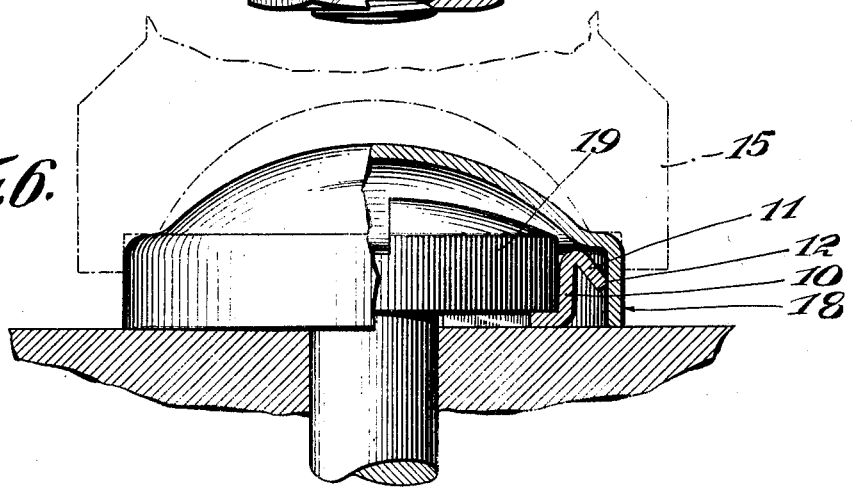
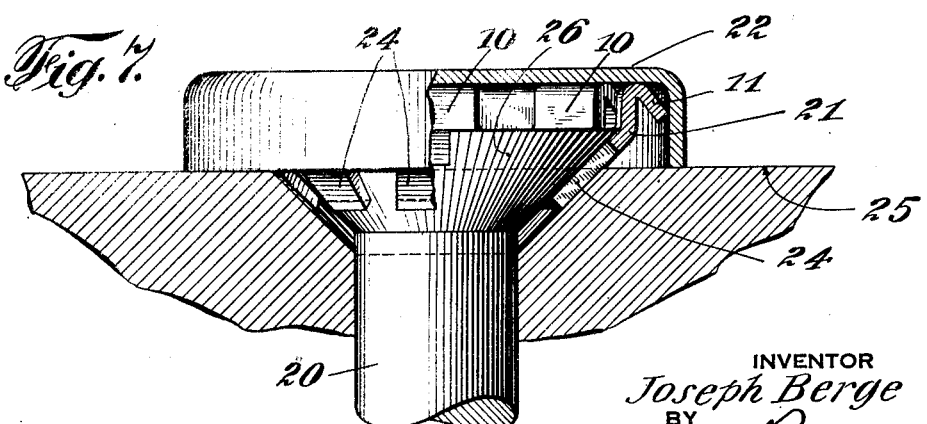
INVENTOR
Joseph Berge
BY
George Ramsey
his ATTORNEY Patented May 19, 1931

1,805,937

UNITED STATES PATENT OFFICE

JOSEPH BERGE, OF MONTCLAIR, NEW JERSEY

LOCK CAP FOR FASTENERS

Application filed December 27, 1928. Serial No. 328,718.

The present invention relates broadly to fasteners and more especially to a protective cap and anchoring base adapted to protect and cover a fastener head and at the same time prevent accidental loosening of the fastener itself.

Heretofore in the art of fasteners, the common means of ornamenting the exposed head or nut of a fastener has been to provide the ornamentation directly on the nut or head of the fastener itself. In the case of bolts, it is common in the art to make ornamented bolt heads or nuts, and in the case of screws, it likewise has been common in the art to provide ornamental or plated screw heads. In both cases, however, the ornamentation is limited by the utilitarian character of the head of the fastener which requires multi-sides on a nut and a kerf on a screw head. Furthermore, it is expensive to provide ornamentations upon each screw head or nut in view of the fact that a relatively large piece of metal must be treated and furthermore, the metal of the screw or nut must be considered primarily from its utilitarian standpoint and therefore is not usually the type of metal best adapted for ornamental impressions.

It is also common in the art to use various types of locking washers beneath screw heads and nuts, but these washers necessarily are of hardened material, usually of carbon steel, and it is not unusual to find a nicely ornamented or plated nut seated against a lock washer of steel which rusts badly in ordinary use and thereby detracts from the neat appearance of the ornamented nut.

The present invention overcomes the difficulties of the known art by providing an anchoring base which includes a lock washer feature and comprises the anchor for an ornamental cap made of material well adapted for ornamental work and which cap is securely and permanently anchored to the anchor base, thereby enclosing the head or nut of an ordinary fastener in such manner that the entire exposed part is ornamental in character. This permits the choosing of the best material for the lock washer anchoring base and also the choice of the most satisfactory material for hollow enclosing cap so that the final result is that of an ornamented member or button making a neat finished appearance to the completed article. Furthermore, this cap is so securely anchored in place as to require substantial destructive effort to remove the cap and therefore provides security against unauthorized removal of the fastening means, thereby preventing tampering with the fastener after it has finally been set in position.

It is realized that the present invention may be practiced by immaterial deviations from the present disclosure and therefore the disclosure herewith is to be understood as illustrative and not in the limiting sense.

Other and further objects of the present invention will in part be obvious and will in part be pointed out hereinafter by reference to the accompanying drawings forming a part of the specification hereof.

Fig. 1 is a perspective view illustrating one form of the present invention with the parts in extended position.

Fig. 2 is a plan view of one form of lock washer anchor.

Fig. 3 is a sectional view taken on line 3—3 of Fig. 2.

Fig. 4 is an elevational view of a cover cap showing half thereof in section and with the rim of the cover cap barrel shaped.

Fig. 5 is a detail view showing a dome shaped cover member covering up a half round screw head with half the cap shown in section.

Fig. 6 illustrates a straight walled cap member adapted to cover a filister headed screw with half the cap shown in section, and also shows in dotted lines a setting punch or head which may be used to set the cover over the anchoring lock nut.

Fig. 7 illustrates the invention as applied to a conical headed screw of the type commonly used with wood screws, and shows half the cap in section.

Referring now to the drawings and more especially to Fig. 1 which illustrates in perspective one form of the present invention and comprises a lock washer A which is threaded over a screw bolt B, the head of which is adapted to be locked on cap C in such manner that the locked on cap thoroughly protects the head of the screw bolt while the lock washer prevents rotation of the screw bolt and also comprises the anchoring member for holding the cap C in place.

Referring now more especially to Figs. 1, 2 and 3, the lock washer anchor A comprises a cupped shape member with the bottom of the cap being formed as a lock washer A of the type illustrated in the United States patent to Loomis 142,709, September 9, 1873, which is formed by cutting radial slots 1 from the bolt opening 2 in the bottom of the lock washer member A. These radial slots 1 divide the bottom of the member A into tongue members 4. The inner ends of these tongue members 4 are twisted out of the normal flat plane of the bottom in such manner as to permit the screw bolt B to be rotated clockwise, but to resist an anti-clockwise rotation of the bolt by the upper corners 5 of the tongues 4 biting into the under part of the bolt head 6 and the lower corners 7 of the tongues 4 biting into the supporting member 8 (see Fig. 5) against which the screw bolt head 6 is set. The twist on the tongues 4 is determined with reference to the direction of rotation which it is desired to prevent, and these tongues 4 may be set to resist clockwise rotation, or certain tongues 4 may be twisted one way and others twisted the other way to prevent rotation in both directions as where nails or rivets comprise the fasteners. The rim of the lock washer anchor is formed with slots 9 which divide the rim of this member into anchoring spring fingers 10 having outwardly and downwardly extending ends 11. These finger ends or finger tips are formed with straight anchoring faces 12. This anchoring member A preferably is formed from untempered spring steel and after this anchoring member has been completely formed, it is oil tempered so that it is hard and at the same time springy.

When the bolt head 6 is tightened down on the work 8 the bolt is securely locked in position against rotation and is ready to be capped. The ornamental cap C is formed in such manner that the rim 14 is slightly smaller than the largest dimensions measured diametrically across the lock washer from tip to tip of the anchoring faces 12 of the spring fingers. A capping tool 15 shown in dotted lines in Fig. 6 may be set down over the rim 14 of the cap and may be struck a blow of sufficient force to drive the rim down over the end faces 12 of the spring fingers 10. These spring fingers 10 yield inwardly and permit the rim 14 of the cap C to seat tightly against the work face 8. It will be observed by referring to Fig. 2 (where the inner surface of the rim is designated in dotted lines at 14) that since the ends 11 of the spring fingers are provided with straight faces 12, the corners of these work faces 12 bite into the inner side wall of the rim 14 of the cap C. It is very difficult to remove a cap once set, from these spring fingers for the reason that the cap C sets tightly against the work face 8 and does not present any anchorage whereby a prying tool may be easily inserted, but even if a thin knife edged tool is inserted beneath the cap edge and the work face, the ends 12 of the spring fingers bite deeply into the rim of the cap and effectively resist removal of the cap so that it is necessary to deface the device before the cap C can be removed. This forms an effectual barrier to unauthorized tampering with the capped screw or fastener because the tampering cannot be done without leaving easily detected traces.

It frequently happens that it is desirable to ornament the cover caps C to present an attractive appearance, and ornamentation such as shown at 13 in Figs. 1 and 4 may be resorted to. This ornamentation may take any form adaptable for this type of device, such as pure conventional ornaments or the crests or monogram of the user. Where monograms or letters are used, the cover cap C when seated with the letters in upright position maintains these letters permanently as set since the anchoring member A is securely locked beneath the fastener head 6 so that there can be no rotation to the anchoring member A. The cover cap C is also securely locked against rotation on the anchoring member, because of the corners of the work faces 12 biting into the inner face of the rim 14 of the cap C.

Various forms of cover caps may be used for various purposes, for example, one form which locks on very tightly is illustrated in Fig. 4 wherein the rim 16 is barrel shaped to present a concaved inner wall to the action of the anchoring spring faces 12 of the anchor A.

In Fig. 5, a dome shaped cover 17 is illustrated and wherein the faces 12 of the spring fingers 10 bite into the side wall of the dome with sufficient power to anchor the dome securely in place.

In Fig. 6, the side wall of the dome is illustrated as comprising a cylindrical rim 18 and the ends 12 of the spring fingers 10 bite into this straight side wall of this cylindrical rim 18. This particular form is illustrated as covering a filister head 19.

In Fig. 7, a form is illustrated as being adapted for conical head screws 20 such as are commonly used on wood screws, and in this form, the anchoring member 21 is constructed to fit beneath the wood screw head and the cover cap 22 is shown as being substantially flat. In this form, tongues 24 of the anchoring member twisted in such manner as to bite into the work face 25 and also into the under surface of the conical head 26.

The figures of the drawings which broadly illustrate the invention have shown the anchoring member as co-operating with screw heads or screw bolts. It is, however, to be understood that the present invention may be utilized equally well to cover the end of the bolt carrying the nut or may even be used to cover rivet heads, nails or other through fasteners well known in the art. While the anchoring lock washer preferably is made of hardened spring steel, the cap is preferably made of softer material such as hard drawn brass, stainless steel, or other materials such as bakelite, etc., adapted for this purpose. The ornamentation on the caps may be by embossing, enameling or by the use of covering materials such as celluloid or bakelite or any other well known ornamentation medium commonly used for ornamenting devices of this general character.

The term "through fastener" as used in the specification and claims, is used to mean such fasteners as nails, screws, bolts, rivets, and the like, which enter into or pass through the materials to which the fastener is secured.

From the foregoing it will be observed that the lock-cap comprising the present invention so cooperates with the nut-lock that it is impossible to remove the cap or unscrew the fastener without destructive effort, that is, it is necessary to destroy or deface the cap with a cold chisel or some other destructive instrument before the fastener can be reached for tampering.

Having described my invention, what I claim is:

1. A device for covering the heads of through fasteners comprising in combination an anchoring member and a cover cap adapted to enclose said anchoring member and the head of a fastener, and holding means carried by said anchoring member to permit said cap to have telescoping movement in one direction only relative to said anchoring member and to securely lock said cover cap in position.

2. A device for covering the heads of through fastening members, locking means to prevent the rotation of the fastening member, anchoring means, and a cover cap adapted for telescoping movement in one direction only relative to said anchoring means to enclose said anchoring means and an end of said fastening member.

3. A device for ornamentating the ends of through fasteners comprising an anchoring member adapted to be securely held in position by said through fastener, locking devices on said anchoring means to prevent rotation of said fastener and of said anchoring means, locking means carried by said anchoring means, and an ornamental cover cap adapted for telescoping movement in one direction only relative to said locking means whereby said anchoring member securely locks said ornamental cover cap in position over one end of said fastener.

4. In a device for covering one end of a through fastener comprising a nut lock anchoring device mounted beneath the head of said through fastener, resilient spring arms integral with said nut lock and surrounding the head of said through fastener, and a cover cap interlocking the said spring arms after said through fastener is in operative position whereby said cover cap is not removable without destructive effort.

5. In a device for covering one end of through fasteners, the combination of an anchoring member having spring fingers with ratchet formed ends, nut lock means on said anchoring member, and a cover cap adapted to telescope over said spring fingers in one direction only.

6. An article of manufacture comprising a protector for one end of through fasteners and comprising a nut lock anchoring base, spring fingers extending outwardly on one side of said nut lock and having downwardly extending ends provided with work faces, a cap having a side wall of such diameter as to cause said spring fingers to be under tension when the side wall of the cap is forced over said spring fingers and to cause the ends of said spring fingers to bite into said side wall and resist forces tending to remove the cap from the anchoring member.

7. An article of manufacture comprising a cover for one end of a through fastener, said cover comprising an anchoring member having a plurality of spring fingers extending from one side of said anchoring member with the ends of said spring fingers extending outwardly and backwardly relative to the direction of the fingers, a cover cap adapted to telescope over said anchoring member in one direction and with the inner wall of said cover cap being slightly less in diameter than the maximum diameter of said anchoring member whereby when said cover cap is telescoped over said anchoring means said spring fingers are flexed inwardly and tend to expand outwardly to force the ends of said spring fingers into the side wall of said cover cap to prevent removal thereof.

8. An article of manufacture comprising a protecting cover for the ends of through fasteners comprising an anchoring member of hard spring material with spring fingers arranged on the circumference thereof and with the ends of said spring fingers comprising substantially straight lines, a cover cap constructed to be telescoped over said anchoring member and to flex said spring fingers inwardly whereby the ends of said spring fingers bite into the side wall of said cover cap to prevent removal of said cover cap from said anchor.

9. An article of manufacture comprising a protecting cover cap for one end of a through fastener, comprising an anchoring member of substantialy circular contour with a plurality of fingers adjacent the periphery of said member, with the ends of said fingers extending toward the work face on which said anchoring member is adapted to be set, locking means on said anchoring member to prevent the rotation of said member, and a cover cap of softer material than said anchoring member and being adapted to be forced over said anchoring member whereby the ends of said fingers bite into the side wall of said cover cap to prevent removal thereof from said anchoring member.

10. A device of the class described comprising a nut lock, a cover cap covering said nut lock, and means to lock the cover cap to the nut lock against removal therefrom without destructive effort.

JOSEPH BERGE.